US012722637B2

(12) United States Patent
Kondo et al.

(10) Patent No.: US 12,722,637 B2
(45) Date of Patent: Sep. 1, 2026

(54) VEHICLE DECELERATION ASSIST CONTROL DEVICE

(71) Applicant: TOYOTA JIDOSHA KABUSHIKI KAISHA, Toyota (JP)

(72) Inventors: Kumiko Kondo, Numazu (JP); Shogo Ito, Sunto-gun (JP); Shinya Kawamata, Mishima (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 28 days.

(21) Appl. No.: 18/740,528

(22) Filed: Jun. 12, 2024

(65) Prior Publication Data

US 2025/0050880 A1 Feb. 13, 2025

(30) Foreign Application Priority Data

Aug. 7, 2023 (JP) ................................ 2023-128299

(51) Int. Cl.

*B60W 30/14* (2006.01)
*B60W 30/18* (2012.01)
*B60W 30/182* (2020.01)

(52) U.S. Cl.

CPC ........ *B60W 30/146* (2013.01); *B60W 30/181* (2013.01); *B60W 30/18154* (2013.01); *B60W 30/182* (2013.01); *B60W 2520/10* (2013.01); *B60W 2540/106* (2013.01)

(58) Field of Classification Search

CPC ............ B60W 30/146; B60W 30/181; B60W 30/18154; B60W 30/182; B60W 2520/10; B60W 2540/106; B60W 2540/10; B60W 2554/402; B60W 2554/802;

(Continued)

(56) References Cited

U.S. PATENT DOCUMENTS

| | | | |
|---|---|---|---|
| 8,355,851 | B2 | 1/2013 | Inoue et al. |
| 8,370,040 | B2 | 2/2013 | Inoue et al. |
| 8,417,430 | B2 | 4/2013 | Saeki |

(Continued)

FOREIGN PATENT DOCUMENTS

| | | | |
|---|---|---|---|
| JP | 2006-123588 | A | 5/2006 |
| JP | 2010-250600 | A | 11/2010 |

(Continued)

*Primary Examiner* — Fadey S. Jabr
*Assistant Examiner* — Michael J Herrera
(74) *Attorney, Agent, or Firm* — SoraIP, Inc.

(57) ABSTRACT

A vehicle deceleration assist control device has a control unit for performing deceleration assist control in an accelerator operation amount mode for decelerating the vehicle according to the accelerator operation amount when the deceleration target is detected in a situation where the accelerator operation amount exceeds the reference value and the deceleration target is detected by controlling the deceleration device. The control unit calculates a target deceleration speed for making the vehicle speed of the vehicle when the vehicle reaches the position of the deceleration target to be a target vehicle speed determined by the type of the deceleration target, sets a mode change timing according to the type of the deceleration target, and when it is determined to be the mode change timing, a mode change from the accelerator operation amount mode to a non-accelerator operation amount mode is performed.

1 Claim, 5 Drawing Sheets

(58) Field of Classification Search
CPC ......... B60W 30/143; B60W 30/18109; B60W 30/09; B60W 30/0956; B60W 50/0098
See application file for complete search history.

(56) References Cited

U.S. PATENT DOCUMENTS

| | | | | |
|---|---|---|---|---|
| 8,548,709 | B2 | 10/2013 | Morita | |
| 8,768,597 | B2 | 7/2014 | Kagawa | |
| 9,174,643 | B2 | 11/2015 | Aso | |
| 10,017,178 | B2 | 7/2018 | Morimoto et al. | |
| 10,118,617 | B2 | 11/2018 | Urano et al. | |
| 10,486,698 | B2 | 11/2019 | Masui et al. | |
| 2009/0299559 | A1* | 12/2009 | Shimohira | B60W 20/50 903/930 |
| 2014/0121902 | A1* | 5/2014 | Moran | B60W 50/0097 701/1 |
| 2015/0307091 | A1* | 10/2015 | Gokan | G01S 7/539 701/70 |
| 2018/0273024 | A1* | 9/2018 | Umetsu | B60W 30/1882 |
| 2018/0274461 | A1* | 9/2018 | Ujihara | F02P 5/1502 |
| 2019/0295419 | A1 | 9/2019 | Tosa et al. | |
| 2020/0339107 | A1* | 10/2020 | Ogawa | B60T 8/1755 |
| 2022/0032883 | A1* | 2/2022 | Ito | B60T 7/12 |
| 2022/0297643 | A1* | 9/2022 | Gu | B60W 30/18118 |
| 2024/0174227 | A1* | 5/2024 | Nimura | G08G 1/143 |
| 2024/0286626 | A1* | 8/2024 | Calleija | B60W 60/001 |

FOREIGN PATENT DOCUMENTS

| | | | |
|---|---|---|---|
| JP | 6747584 | B2 | 9/2020 |
| JP | 2021-116000 | A | 8/2021 |

* cited by examiner

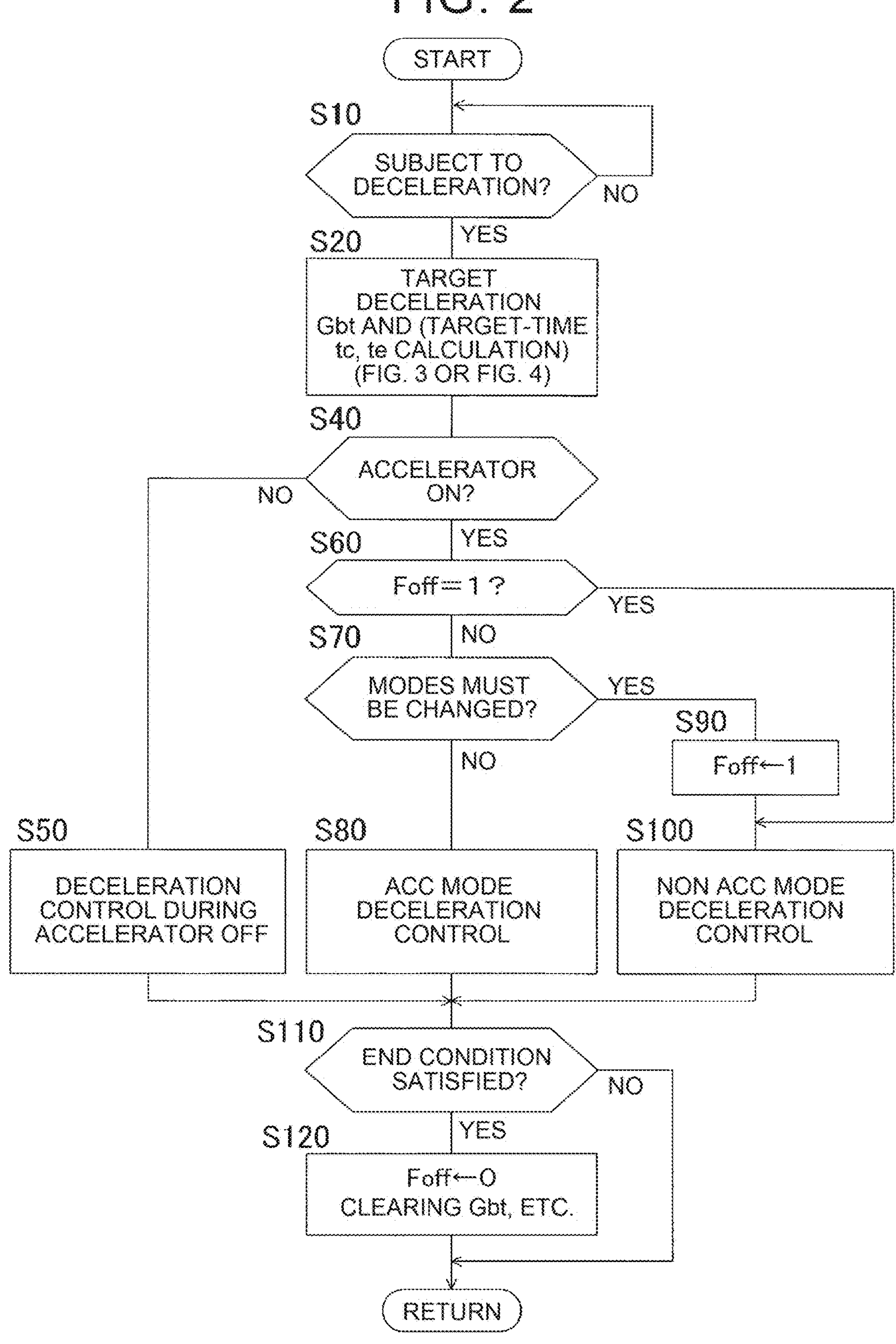
FIG. 2
START
S10
SUBJECT TO DECELERATION?
NO
YES
S20
TARGET DECELERATION Gbt AND (TARGET-TIME tc, te CALCULATION) (FIG. 3 OR FIG. 4)
S40
ACCELERATOR ON?
NO
YES
S60
Foff=1 ?
YES
NO
S70
MODES MUST BE CHANGED?
YES
S90
Foff←1
NO
S50
DECELERATION CONTROL DURING ACCELERATOR OFF
S80
ACC MODE DECELERATION CONTROL
S100
NON ACC MODE DECELERATION CONTROL
S110
END CONDITION SATISFIED?
NO
YES
S120
Foff←0
CLEARING Gbt, ETC.
RETURN

VEHICLE DECELERATION ASSIST CONTROL DEVICE

CROSS-REFERENCE TO RELATED APPLICATION

This application claims priority to Japanese Patent Application No. 2023-128299 filed on Aug. 7, 2023, incorporated herein by reference in its entirety.

BACKGROUND

1. Technical Field

The present disclosure relates to a deceleration assist control device for a vehicle such as an automobile.

2. Description of Related Art

As one of driving assist control for vehicles such as automobiles, there is known deceleration assist control in which a vehicle is automatically decelerated when a deceleration target is detected in front of the vehicle, the deceleration target being a target that needs to be approached with the vehicle speed reduced through deceleration, such as an intersection without a traffic light, for example.

For example, Japanese Unexamined Patent Application Publication No. 2021-116000 (JP 2021-116000 A) describes a deceleration assist device configured to provide deceleration assist when a deceleration target is detected, a deceleration assist start condition is satisfied, and an accelerator is not on, that is, an accelerator pedal is not depressed.

SUMMARY

There is known a deceleration assist device that provides deceleration assist according to an accelerator operation amount when an accelerator pedal return operation is started and the accelerator operation amount starts reducing, even if the accelerator is on, that is, the accelerator pedal is depressed. According to the deceleration assist device of this type, the effect of the deceleration assist can be improved by starting the deceleration control early.

When the deceleration assist is provided according to the accelerator operation amount when the accelerator is on, however, a driver must control the vehicle speed by controlling the depression amount of the accelerator pedal. Therefore, it is not easy to control the vehicle speed to a necessary vehicle speed, depending on the type of the deceleration target and the traveling situation of the vehicle.

For example, when it is necessary to stop the vehicle for the deceleration target, such as when the deceleration target is a red signal, the vehicle speed must be controlled such that the vehicle speed becomes 0 when the vehicle reaches the deceleration target. When the road is an uphill road, meanwhile, the deceleration of the vehicle may be higher than the deceleration desired by the driver due to the deceleration caused by the inclination of the road acting on the vehicle, in addition to the deceleration caused by the deceleration assist. When the driver performs a steering operation while reducing the accelerator operation amount, further, the driver must control the vehicle speed by controlling the accelerator operation amount while controlling the traveling direction of the vehicle through the steering operation.

The present disclosure provides a deceleration assist control device improved so as to be able to easily control a vehicle speed to a necessary vehicle speed compared to the related art, regardless of the type of a deceleration target, while improving the effect of deceleration assist by starting deceleration control early.

An aspect of the present disclosure provides a vehicle deceleration assist control device (10) including an accelerator operation amount detection device (accelerator operation amount sensor 64) that detects an accelerator operation amount (Acc), a deceleration target detection device (56) that detects a deceleration target (such as a T-junction 80) in front of a vehicle (16), a deceleration device (30) that decelerates the vehicle, and a control unit (driving assist electronic control unit (ECU) 50) that controls the deceleration device, the control unit being configured to perform deceleration assist control (S80) in an accelerator operation amount mode in which the vehicle is decelerated according to the accelerator operation amount by controlling the deceleration device when the deceleration target is detected (S10) in a situation (S40) where the accelerator operation amount exceeds a reference value (Accc).

The control unit (driving assist ECU 50) is configured to calculate a target deceleration (Gbt) for causing a vehicle speed (V) of the vehicle at a time when the vehicle reaches a position of the deceleration target to be a target vehicle speed (Vt) determined according to a type of the deceleration target, set a mode change timing (tc) according to the type of the deceleration target, and make a mode change (S90) from the accelerator operation amount mode to a non-accelerator operation amount mode in which the vehicle is decelerated based on the target deceleration (S100) when it is determined to be the mode change timing (S70).

According to the above configuration, the target deceleration for causing the vehicle speed of the vehicle at the time when the vehicle reaches the position of the deceleration target to be the target vehicle speed determined according to the type of the deceleration target is calculated, and the mode change timing is set according to the type of the deceleration target. When it is determined to be the mode change timing, further, the deceleration assist control is performed to make a mode change from the accelerator operation amount mode to a non-accelerator operation amount mode in which the vehicle is decelerated based on the target deceleration.

Therefore, the deceleration of the vehicle is first controlled according to the accelerator operation amount in the accelerator operation amount mode, and when it is determined to be the mode change timing, the deceleration of the vehicle is automatically controlled based on the target deceleration in the non-accelerator operation amount mode. Thus, when a mode change is made, the driver can control the vehicle speed to a necessary vehicle speed without controlling the amount of depression of the accelerator pedal. Therefore, it is possible to easily control a vehicle speed to a necessary vehicle speed compared to the related art while improving the effect of deceleration assist by starting deceleration control early.

According to the above configuration, in addition, the target deceleration for causing the vehicle speed of the vehicle to be the target vehicle speed determined according to the type of the deceleration target is calculated, and the mode change timing is set according to the type of the deceleration target. Therefore, it is possible to easily control the vehicle speed to a necessary vehicle speed, regardless of the type of the deceleration target, and make a mode change at a timing that matches the type of the deceleration target.

In one aspect of the present disclosure, the control unit (driving assist ECU 50) may be configured to, when it is determined (S22) that it is necessary to stop the vehicle (16)

for the deceleration target, determine that it is the mode change timing (S70) when it is determined that a predetermined time has elapsed since a time when the deceleration target was first detected.

According to the above aspect, when it is determined that it is necessary to stop the vehicle for the deceleration target, a mode change can be made from the accelerator operation amount mode to the non-accelerator operation amount mode when a predetermined time has elapsed since the time when the deceleration target was first detected.

In another aspect of the present disclosure, the control unit (driving assist ECU 50) may be configured to variably set the predetermined time (S22, S24, S30) according to at least one of the type of the deceleration target and a traveling situation of the vehicle.

According to the above aspect, the timing of a mode change from the accelerator operation amount mode to the non-accelerator operation amount mode can be variably set according to at least one of the type of the deceleration target and the traveling situation of the vehicle.

In still another aspect of the present disclosure, the control unit (driving assist ECU 50) may be configured to, when it is determined (S30) that a steering operation is being performed, make the mode change timing earlier (S36) than when it is not determined that a steering operation is being performed.

According to the above aspect, when a steering operation is being performed, the mode change timing can be made earlier than when a steering operation is not being performed, and the timing when the vehicle is decelerated based on the target deceleration can be made earlier. Therefore, the driver can concentrate on the steering operation without controlling the accelerator operation amount at an early stage compared to when the mode change timing is not made earlier.

In still another aspect of the present disclosure, the control unit (driving assist ECU 50) may be configured to, when it is determined (S32) that there are a plurality of deceleration targets, make the mode change timing earlier (S36) than when it is determined that there is one deceleration target.

According to the above aspect, when there are a plurality of deceleration targets, the mode change timing can be made earlier than when there is one deceleration target, and the timing when the vehicle is decelerated based on the target deceleration can be made earlier. Therefore, it is possible to save the driver from controlling the accelerator operation amount earlier than when the mode change timing is not made earlier.

Other objects, other features, and accompanying advantages of the present disclosure will be readily understood from the description of embodiments of the present disclosure made with reference to the following drawings.

BRIEF DESCRIPTION OF THE DRAWINGS

Features, advantages, and technical and industrial significance of exemplary embodiments of the disclosure will be described below with reference to the accompanying drawings, in which like signs denote like elements, and wherein:

FIG. 2 is a flowchart illustrating a deceleration assist control routine according to the embodiment;

DETAILED DESCRIPTION OF EMBODIMENTS

Hereinafter, embodiments of the present disclosure will be described in detail with reference to the accompanying drawings.

Figure 1:
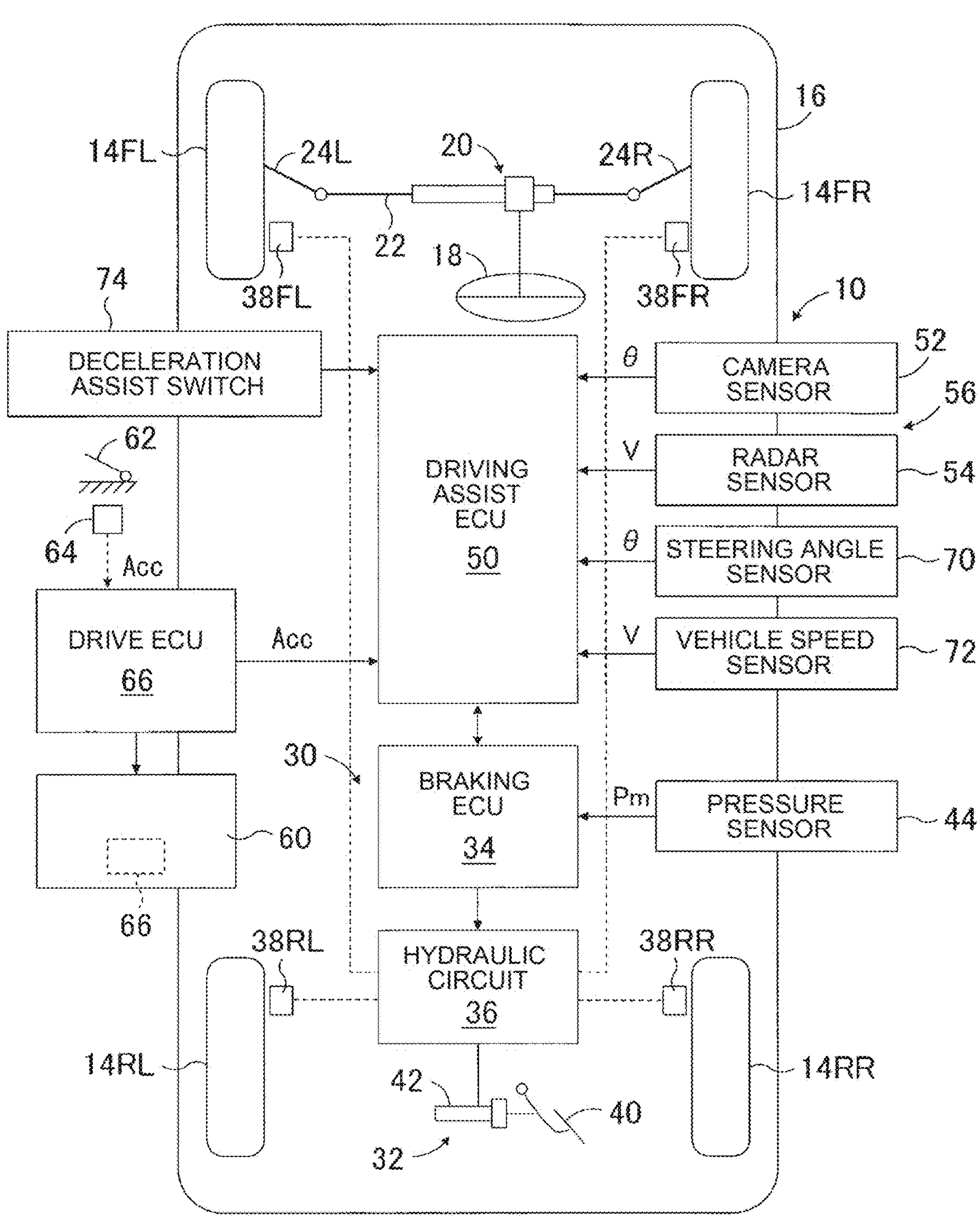
FIG. 1 is a schematic configuration diagram illustrating a deceleration assist device according to an embodiment.

The vehicle deceleration assist control device 10 according to the embodiment shown in FIG. 1 is applied to a vehicle 16 having a wheel 14FL, 14FR, 14RL and a 14RR. The vehicle 16 may be a vehicle capable of autonomous driving. In the embodiment, the left and right front wheels 14FL and 14FR are steered wheels and drive wheels, and the left and right rear wheels 14RL and 14RR are non-steered wheels and driven wheels. The front wheels 14FL and 14FR are steered through the rack bar 22 and the tie rods 24L and 24R by an electric power steering device 20 that is driven in response to a driver operating the steering wheel 18. In the following explanation, the electronic control device is referred to as an Electronic Control Unit (ECU).

The deceleration assist control device 10 includes a deceleration device 30 that decelerates the vehicle 16, and a driving assist ECU 50 as a control unit that controls the deceleration device. The deceleration device 30 includes a braking device 32 that applies a frictional braking force to the wheels 14FL to 14RR, and a braking ECU 34 that controls the braking device. The braking device 32 includes a hydraulic circuit 36, frictional braking force generators 38FR, 38FL, 38RR and 38RL provided on the wheels 14FL to 14RR, and a master cylinder 42 that feeds the brake oil in response to a depression of the brake pedal by the driver. Although not shown in detail in FIG. 1, the hydraulic circuit 36 includes a reservoir, an oil pump, various valve devices, and the like, and functions as a brake actuator.

The braking device 32 applies a braking force to the wheels 14FL to 14RR that is proportional to the pressure in the corresponding wheel cylinder of the frictional braking force generators 38FR to 38RL. The pressure in the wheel cylinder is controlled in accordance with the pressure (master cylinder pressure Pm) in the master cylinder 42 that is driven in response to depression of the brake pedal 40 by the driver in a normal state. That is, the master cylinder pressure Pm is detected by the pressure sensor 44, and the pressure in the respective wheel cylinders is controlled based on the master cylinder pressure Pm by the braking ECU 34. Further, the pressure in the respective wheel cylinders is controlled irrespective of the amount of depression of the brake pedal 40 by the driver by controlling the oil pump and the various valve devices by the braking ECU 34 as required, so that the automatic braking is performed.

Vehicle 16 includes an engine-like driving device 60 that applies a driving force to the left and right front wheel 14FL, 14FR which are driving wheels. A depression amount of the accelerator pedal 62 by the driver is detected as the accelerator operation amount Acc by the accelerator operation amount sensor 64. The output of the driving device 60 is controlled by the drive ECU 66 based on the accelerator operation amount Acc in a normal state, and is controlled independently of the accelerator operation amount Acc as needed. Note that the driving device 60 may be any device capable of applying a driving force to the driving wheels, and may be, for example, an electric motor, a hybrid system, or the like. The drive wheels may be left and right rear wheels 14RL and 14RR, or may be four wheels 14FL to 14RR.

Further, as indicated by a broken line in FIG. 1, the driving device 60 may include a regenerative device 66 that generates regenerative braking force by converting rotational energy of the drive wheels into electrical energy. The regenerative device 66 is controlled by a drive ECU 66 based on a control command from the braking ECU 34. The regenerative device 66 functions as a part of the deceleration device 30 when generating the regenerative braking force.

ECU includes a microcomputer as a main part, and the microcomputer includes a CPU, ROM, RAM, a readable/writable nonvolatile memory (N/M), an interface (I/F), and the like. The CPU realizes various functions by executing instructions (programs, routines) stored in the ROM. Furthermore, these ECU are connected to each other in a data-exchangeable manner via a Controller Area Network (CAN). Therefore, detected values of sensors (including switches) connected to a specific ECU are transmitted to other ECUs as well. Note that a plurality of ECU may be integrated into one ECU.

The driving assist ECU 50 is a central control device that performs driving assistance control such as deceleration assistance control, tracking inter-vehicle distance control, and lane departure prevention control. In an embodiment, the driving assist ECU 50 cooperates with other ECU to perform deceleration assistance control by auto-braking, as will be described further below.

A camera sensor 52 and a radar sensor 54 are connected to the driving assist ECU 50. The camera sensor 52 and the radar sensor 54 may include a plurality of camera devices and a plurality of radar devices, respectively. The camera sensor 52 and the radar sensor 54 function as a deceleration target detection device 56 that detects a deceleration target at least in front of the vehicle 16. Note that a Light Detection And Ranging (LiDAR) may be used instead of the radar sensor 14 or in addition to the radar sensor 14.

The deceleration target may be an red signal, a paused road sign and a road surface sign, an intersection without a signal (a cross road where the own vehicle travels is not a priority road, a chord road and a branch road), a stopped vehicle, a curved road, a preceding vehicle, or the like. In the present application, the red signal, the paused road sign and the road marking, and the intersection without the signal are referred to as stop targets as necessary. The stop target is an object that the vehicle needs to stop.

Further, a steering angle sensor 70, a vehicle speed sensor 72, and a deceleration assist switch 74 are connected to the driving assist ECU 50. The steering angle sensor 70 detects the steering angle θ as an operation amount of the steering wheel 18 by the driver. The vehicle speed sensor 72 detects the vehicle speed V as the traveling speed of the vehicle 16. The deceleration assist switch 74 is operated by the driver, and when the deceleration assist switch is on, the deceleration assist control is executed by the driving assist ECU 50 as described later. Although not shown in FIG. 1, a display device that displays the status of the driving support control such as the deceleration assist control may be connected to the driving assist ECU 50.

When the deceleration target is detected in a situation where the accelerator operation amount Acc exceeds the reference value Accc (0 or a positive constant), the driving assist ECU 50 performs deceleration assistance control in an accelerator operation amount mode in which the vehicle 16 is decelerated in accordance with the accelerator operation amount by controlling the deceleration device 30. In FIG. 2, the accelerator operation amount mode is referred to as a ACC mode.

The driving assist ECU 50 calculates a target deceleration Gbt for setting the vehicle speed of the vehicle when the vehicle 16 reaches the position of the deceleration target to a target vehicle speed Vt determined by the type of the deceleration target, and sets the timing of the mode change according to the type of the deceleration target. When the deceleration target is a preceding vehicle, the deceleration target position is the position of the preceding vehicle when the preceding vehicle is first detected. Further, when it is determined that the timing of the mode change is the timing of the mode change, the driving assist ECU 50 changes the mode of the deceleration assistance control from the accelerator operation amount mode to the non-accelerator operation amount mode in which the vehicle is decelerated based on the target deceleration. In FIG. 2, the non-accelerator operation amount mode is referred to as a non ACC mode.

The target vehicle speed Vt determined by the type of the deceleration target is the vehicle speed Vf of the preceding vehicle when the deceleration target is the preceding vehicle. The target vehicle speed Vt is 0 when the deceleration target is an object to be stopped, i.e., an intersection where there is no red signal, a paused road sign and a road surface sign, or a signal.

For example, when the vehicle speed of the vehicle 16 when the deceleration target is detected is a Vp and the distance between the vehicle 16 and the deceleration target is a Dr, the target deceleration Gbt is calculated according to Equation (1) below. The distance Dr between the vehicle 16 and the deceleration target is estimated based on the detection result of the deceleration target detection device 56.

$$Gbt=(Vp-Vt)/Dr \tag{1}$$

Further, when the deceleration target is detected by the deceleration target detection device 56 in a state where the accelerator operation amount Acc is equal to or larger than the reference value Accc, the deceleration control mode is set to the accelerator operation amount mode, and the vehicle 16 is decelerated in accordance with the accelerator operation amount. The mode of the deceleration assist control is changed from the accelerator operation amount mode to the non-accelerator operation amount mode in which the vehicle 16 is decelerated based on the target deceleration Gbt at the change timing.

In the embodiment, ROM of the driving assist ECU 50 stores a deceleration assistance control program corresponding to the flow chart shown in FIG. 2. CPU of the driving assist ECU 50 performs deceleration assistance control in accordance with the programming.

Deceleration Assist Control

Next, the deceleration assist control routine according to the embodiment will be described with reference to the flowchart shown in FIG. 2. The deceleration assist control according to the flowchart illustrated in FIG. 2 is repeatedly executed at predetermined time intervals when the deceleration assist switch 74 is on.

In the following description, the deceleration assist control according to the flowchart shown in FIG. 2 is simply referred to as "main control". Prior to starting the present control, the flag Foff indicating whether or not the mode of the deceleration assist control has been changed is reset to 0 (indicating that the mode has not been changed).

First, in S10, CPU determines whether or not there is a deceleration target in front of the vehicle 16, that is, whether or not a deceleration target is detected by the deceleration target detection device 56. CPU ends the present control once when a negative determination is made, and advances the present control to S20 when an affirmative determination is made. In particular, CPU resets the flag Foff to 0 when a negative determination is made when the flag Foff is 1.

When the deceleration target is the preceding vehicle and the relative velocity Vr of the vehicle 16 with respect to the preceding vehicle is negative, a negative determination is made in S10. In addition, a negative determination is made, such as when the preceding vehicle changes the course, and when there is a target deceleration Vbt calculated in a S20 to be described later, the target deceleration Vbt is erased. When the road is a curved road, it may be determined that the curved road is a deceleration target when the radius of curvature of the curved road is equal to or smaller than the reference radius. The reference radius may be variably set according to the vehicle speed such that the higher the vehicle speed, the smaller.

In S20, CPU calculates a target deceleration Gbt for setting the vehicle speed V of the vehicle when the vehicle 16 reaches the position of the deceleration target to a target vehicle speed Vt determined by the type of the deceleration target, and sets the timing of the mode change according to the type of the deceleration target.

The time from the time when the deceleration target is first detected to the time when the vehicle 16 is decelerated at the target deceleration Gbt and reaches the position of the deceleration target is taken as a te, and the time from the time when the deceleration target is first detected to the timing of the mode change is taken as a tc. The ratio Rec of the time tc with respect to the time te is set in advance for the respective deceleration targets.

Figure 3:
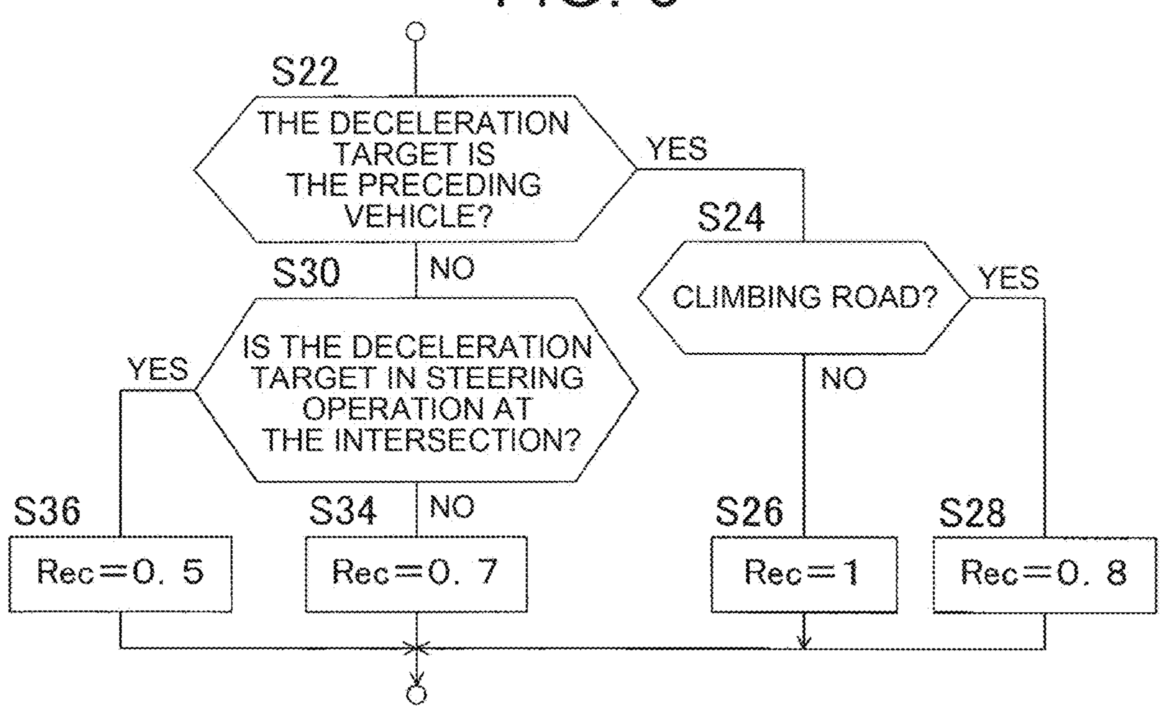
FIG. 3 is a flow chart illustrating a sub-routine of determining a ratio Rec in the first embodiment.
Figure 4:
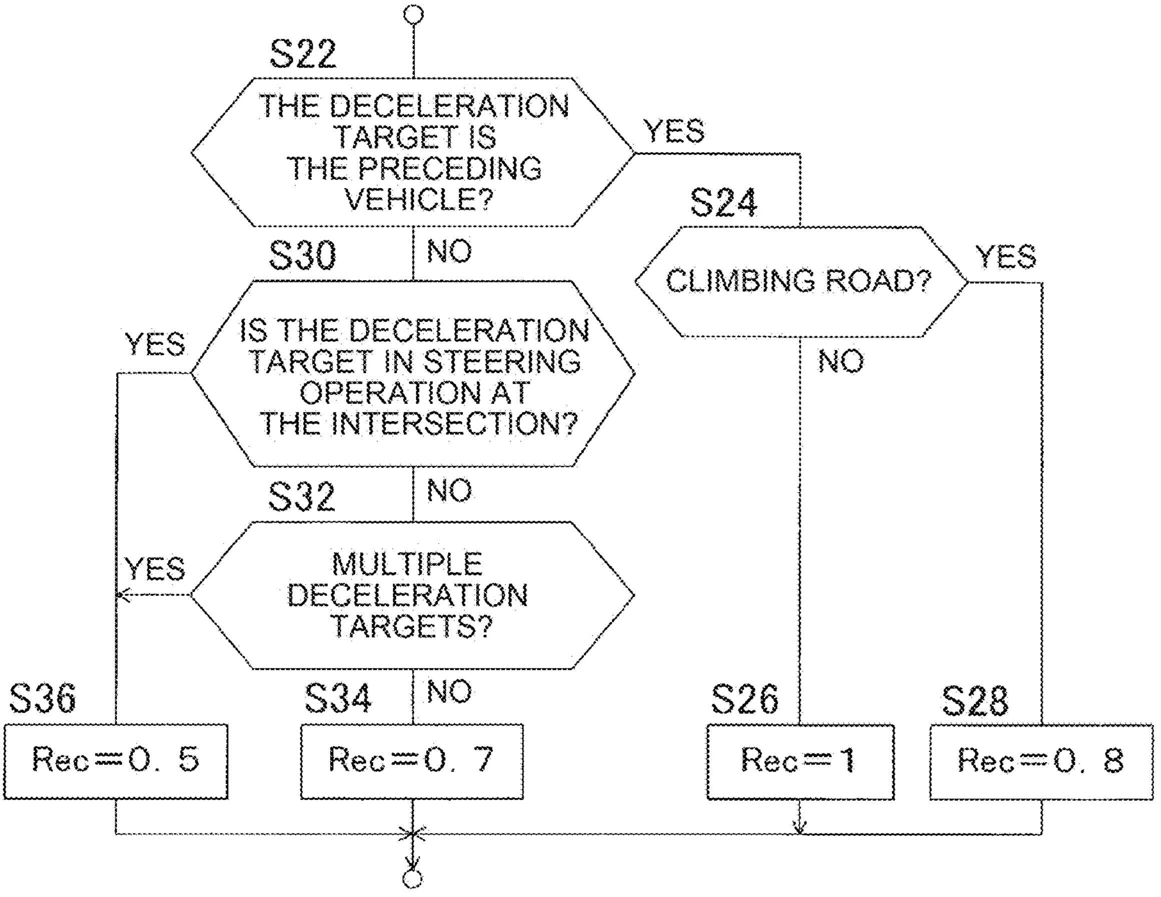
FIG. 4 is a flow chart illustrating a subroutine of determining a ratio Rec in the second embodiment.

In the embodiment, the temporal te is calculated based on the detection result of the deceleration target detection device 56, and the ratio Rec is determined according to the flow chart shown in FIG. 3 or FIG. 4. Further, the time te is determined as the product of the time te and the ratio Rec, and thus the timing of the mode change is determined according to the type of the deceleration target.

In the embodiment, the ratio Rec for the preceding vehicle on the horizontal road is 1, and the ratio Rec for the preceding vehicle on the uphill road is 0.8. The ratio Rec for the stopped object is 0.7 when the driver is not steering, and 0.5 when the steering operation is being performed by the driver. Whether or not the steering operation is performed by the driver may be determined in a manner known in the art based on the steering angle θ and the steering angular velocity Od which is a change rate thereof.

In S40, CPU determines whether or not the accelerator is on, that is, whether or not the accelerator operation amount Acc exceeds the reference Accc. CPU advances the present control to S60 when an affirmative determination is made, and advances the present control to S50 when a negative determination is made.

In S50, CPU performs deceleration control during accelerator-off, that is, deceleration control when the accelerator operation amount Acc is equal to or less than the reference Accc. For example, CPU performs deceleration control so that the deceleration of the vehicle becomes the target deceleration Gbt by calculating the target braking force Fbt of the vehicle 16 based on the target deceleration Gbt and controlling the deceleration device so that the braking force Fb of the vehicle becomes the target braking force Fbt.

In S60, CPU determines whether or not the flag Foff is 1, that is, whether or not the deceleration assistance control has been changed. CPU advances the present control to S100 when an affirmative determination is made, and advances the present control to S70 when a negative determination is made.

In S70, CPU determines whether or not the mode of the deceleration assist control needs to be changed by determining whether or not the elapsed time from the time when the deceleration target is first detected is equal to or more than the time tc. CPU advances the present control to S90 when an affirmative determination is made, and advances the present control to S80 when a negative determination is made.

In S80, CPU performs deceleration control of the vehicle in accordance with the accelerator operation amount so that the deceleration of the vehicle 16 increases as the deceleration of the accelerator operation amount Acc increases. The mode of the deceleration assist control by the deceleration control is referred to as a ACC mode in FIG. 2 and FIG. 5 described later. When the accelerator operation amount Acc is increased, the deceleration of the vehicles is not controlled.

Figure 5A:
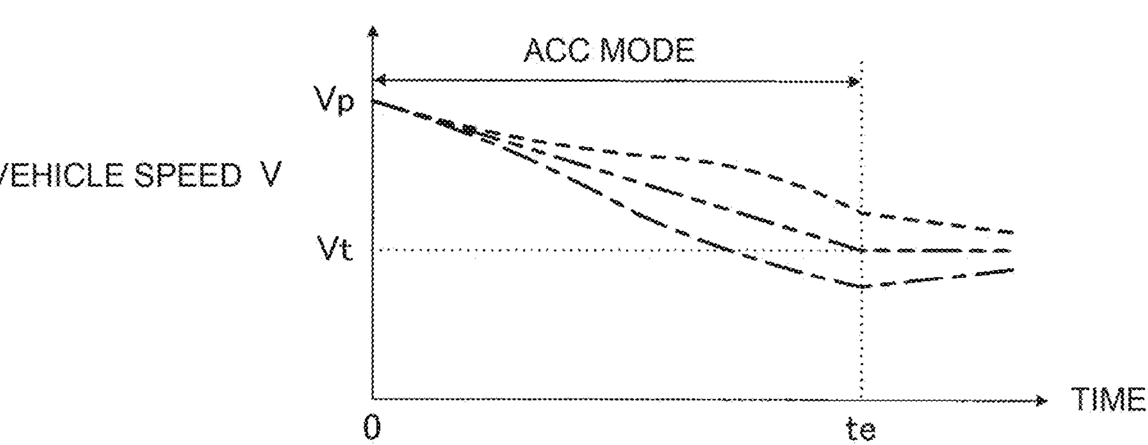
FIG. 5A is a diagram illustrating a change in a vehicle speed V of a vehicle when a deceleration target is detected in front of the vehicle in an accelerator-on condition.
Figure 5B:
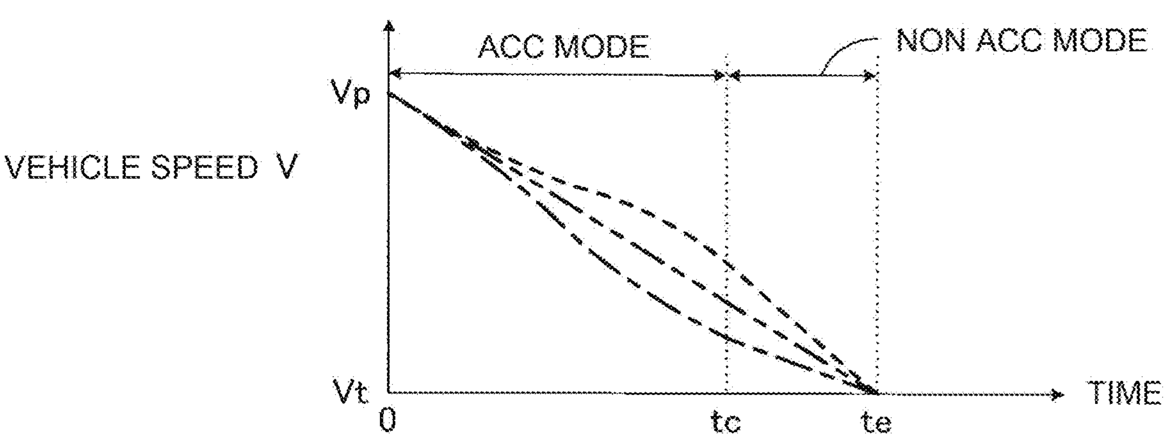
FIG. 5B is a diagram illustrating a change in a vehicle speed V of a vehicle when a deceleration target is detected in front of the vehicle in an accelerator-on condition.

In S90, CPU sets the flag Foff to 1, and in S100, CPU controls the deceleration so that the deceleration of the vehicle becomes the target deceleration Gbt similarly to the deceleration control during the accelerator-off. In FIGS. 2 and 5B, diagram 5C which will be described later, the mode of the deceleration assist control by the control of the deceleration is referred to as a non ACC mode.

In S110, CPU determines whether or not the termination of the deceleration assist control is satisfied, that is, whether or not the deceleration control should be terminated. CPU ends the present control once when a negative determination is made, and advances the present control to S120 when an affirmative determination is made. When it is determined that the vehicle speed V of the vehicle 16 becomes equal to or lower than the target vehicle speed Vt or when it is determined that the duration of the deceleration control is equal to or longer than te, it may be determined that the termination condition of the deceleration assist control is satisfied.

In S120, CPU resets the flag Foff to 0, erases the target deceleration Gbt, the time te, and the time tc when they are being computed, and then terminates the present control once.

When the driving device 60 includes the regenerative device 66, at least a part of the braking force may be the regenerative braking force generated by the regenerative device 66 in the control of the deceleration in S50, S80 and S100.

Control of Ratio Rec Determination in First Embodiment

Next, referring to the flow chart shown in FIG. 3, a ratio Rec determination subroutine according to the first embodiment will be described.

In S22, CPU determines whether or not the deceleration target is a preceding vehicle. CPU advances the present control to S30 when a negative determination is made, and advances the present control to S24 when an affirmative determination is made.

In S24, CPU determines whether or not the road on which the vehicle 16 is traveling is an uphill road. CPU determines that the ratio Rec is 1 in S26 when a negative determination is made, and sets the ratio Rec to 0.8 in S28 when an affirmative determination is made. It should be noted that whether or not the road is an uphill road may be determined based on, for example, information from a navigation device not shown in FIG. 1, or may be determined based on a relationship between the braking/driving force of the vehicle 16 and the acceleration/deceleration speed of the vehicle.

In S30, CPU determines whether the deceleration target is being steered by the driver at the intersection. CPU determines that the ratio Rec is 0.7 in S34 when a negative determination is made, and determines that the ratio Rec is 0.5 in S36 when an affirmative determination is made Control of Ratio Rec Determination in Second Embodiment Next, referring to the flow chart shown in FIG. 4, a sub-routine of the ratio Rec determination in the second embodiment will be described. As can be seen from comparing FIG. 4 with FIGS. 3, S22 to S28 and S34, S36 are carried out in the same way as the corresponding steps in the first embodiment.

In S30, CPU performs the same determination as in the first embodiment, but when an affirmative determination is made, the control proceeds to S36, when a negative determination is made, the control proceeds to S32.

In S32, CPU determines whether or not there are a plurality of factors for the mode-change. CPU advances the present control to S34 when a negative determination is made, and advances the present control to S36 when an affirmative determination is made. For example, when the road in front of the vehicle is a curved road and there is a red signal ahead of the curved road, it may be determined that a plurality of factors of the mode change are caused.

Examples of Operation of First and Second Embodiments

Next, when the deceleration target is detected in front of the vehicle 16 by the deceleration target detection device 56 in the accelerator-on condition, the operation of the first and second embodiments will be described referring to FIGS. 5A to 5C as needed.

Figure 5C:
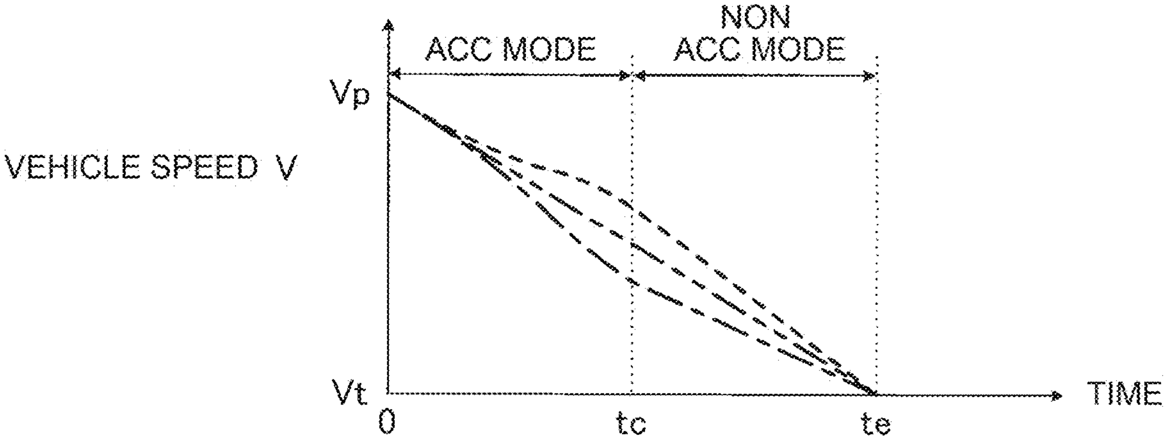
FIG. 5C is a diagram illustrating a change in a vehicle speed V of a vehicle when a deceleration target is detected in front of the vehicle in an accelerator-on condition.

Note that, from 5A shown in FIG. 5C shows an exemplary change in the vehicle speed V of the vehicle 16 in the cases of C1 to C3 described below, respectively. Further, in FIG. 5, the dashed line and the dashed-dotted line indicate examples in which the average deceleration of the deceleration control in the accelerator operation amount mode is smaller and larger than the target deceleration Gbt calculated when the deceleration target is detected, respectively.

C1. When Deceleration Target is Preceding Vehicle (FIG. 5A)

When the roadway is not an uphill road, an affirmative determination and a negative determination are made in S22 and S24, respectively, and the ratio Rec is determined to be 1 in S26. Therefore, since the time tc is the same as the time te, the deceleration assist control is performed in the accelerator operation amount mode, and the mode is not changed from the non-accelerator operation amount mode to the accelerator operation amount mode.

The deceleration of the vehicle 16 is controlled in accordance with the accelerator operation amount Acc until the elapsed time reaches the time te, and when the elapsed time reaches the time S110, an affirmative determination is made, and the deceleration assist control ends. In FIGS. 5A to 5C, a two-dot chain line indicates a change in the vehicle speed V when the deceleration of the vehicle is controlled in the non-accelerator operation amount mode on the basis of the target deceleration Gbt calculated when the deceleration target is detected.

When the deceleration target is a preceding vehicle and the road is an uphill road, the temporal tc is set to 0.8te. Therefore, although not shown in FIG. 5A, the deceleration of the vehicle 16 is controlled in accordance with the accelerator operation amount Acc until the elapsed time is the time tc. When the elapsed time becomes the time tc, the mode is changed to the non-accelerator operation amount mode, and the deceleration is controlled to be in the target deceleration Gbt until the elapsed time becomes the time te.

C2. When Deceleration Target is Stopping Target (FIG. 5B)

Figure 6:
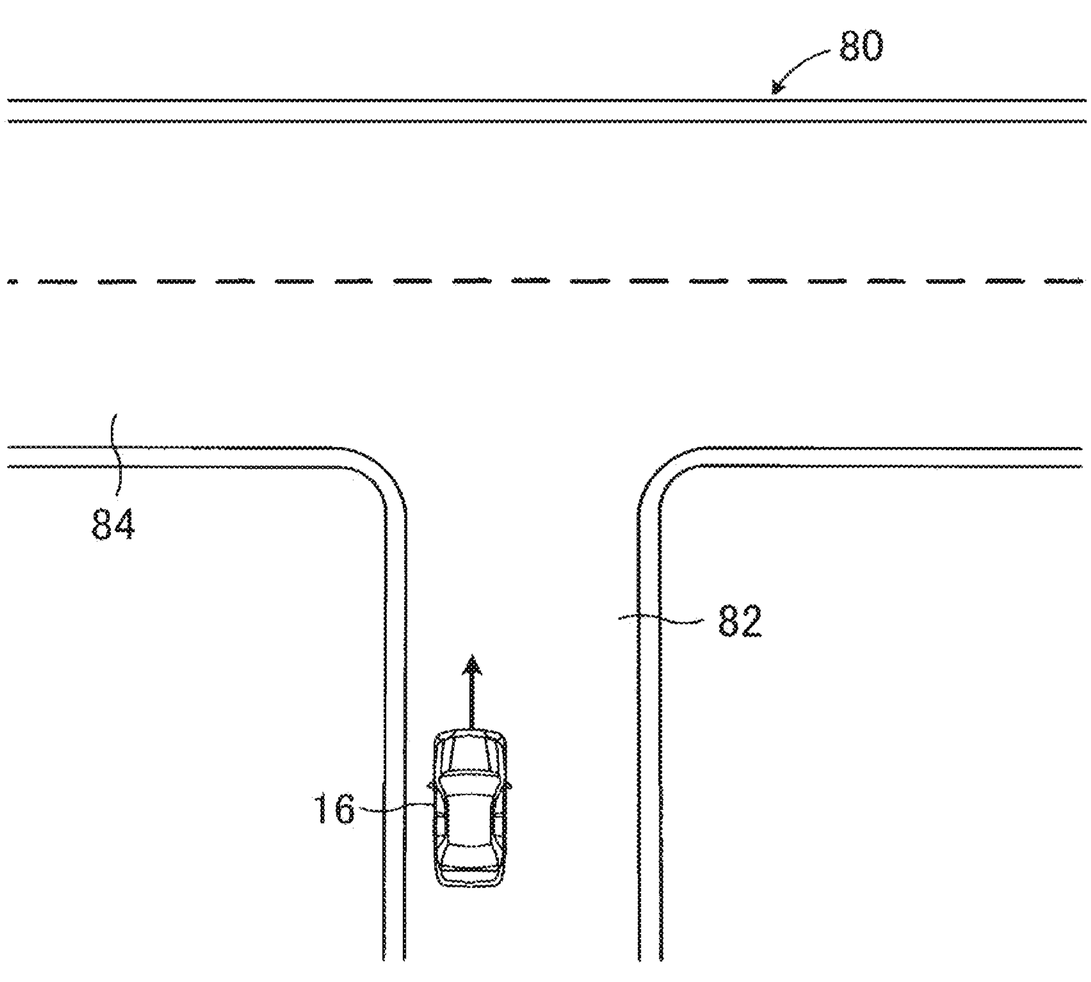
FIG. 6 is a diagram illustrating a situation in which the vehicle approaches a hinge path as a deceleration target of the vehicle.

FIG. 6 shows a situation in which, as an example of a case where the deceleration target is a stop target, there is a T-junction 80 as a deceleration target in front of the vehicle 16, and the vehicle 16 travels on the non-priority road 82 and approaches the priority road 84.

If the deceleration target is a stopping target, a negative determination is made in S22 and S30, and in S34, the ratio Rec is determined at 0.7, and the time te is set to 0.7te. Therefore, as indicated by the broken line and the dashed-dotted line in FIG. 5B, the deceleration of the vehicle 16 is controlled in accordance with the accelerator operation amount Acc until the elapsed time is the time tc. When the elapsed time becomes the time tc, the mode is changed to the non-accelerator operation amount mode, and the deceleration is controlled to be in the target deceleration Gbt until the elapsed time becomes the time te and the vehicle speed V becomes 0.

C3. When Deceleration Target is being Steered by Driver at Intersection (FIG. 5C)

In S22, a negative determination is made, in S30, a positive determination is made, and in S36, the ratio Rec is determined at 0.5, and the time te is set to 0.5te. Therefore, the deceleration of the vehicle 16 is controlled in the same manner as in the case of C2, except that the mode change from the accelerator operation amount mode to the non-accelerator operation amount mode is faster than in the case of C2, as indicated by the broken line and the dashed-dotted line in FIG. 5C.

C4. When Deceleration Target is Plurality of Target Objects to be Stopped (FIG. 5C)

In S22 and S30 of FIG. 4, a negative determination is made, an affirmative determination is made in S32, and in S36, the ratio Rec is determined at 0.5, and the time tc is set to 0.5te. Therefore, the deceleration of the vehicle 16 is controlled in the same manner as in C3.

As can be seen from the above explanation, according to the embodiment, the target deceleration Gbt for setting the vehicle speed V of the vehicle when the vehicle 16 reaches the position of the deceleration target to the target vehicle speed Vt determined by the type of the deceleration target is calculated, and the timing of the mode change is set according to the type of the deceleration target. Further, when it is determined that the timing is the timing of the mode change, the mode is changed from the accelerator operation amount mode to the non-accelerator operation amount mode in which the vehicle is decelerated based on the target deceleration.

Therefore, the deceleration of the vehicle is controlled in accordance with the accelerator operation amount in the accelerator operation amount mode, and when it is determined that the deceleration is the timing of the mode change, the deceleration of the vehicle is automatically controlled in the non-accelerator operation amount mode based on the target deceleration. Therefore, when the mode is changed, the driver can control the vehicle speed to a necessary vehicle speed without controlling the amount of depression of the accelerator pedal, and thus the vehicle speed can be controlled to a necessary vehicle speed more easily than in the related art while improving the effect of the deceleration assist by starting the deceleration control at an early stage.

Further, according to the embodiment, a target deceleration for making the vehicle speed of the vehicle a target vehicle speed determined by the type of the deceleration target is calculated, and the timing of the mode change is set according to the type of the deceleration target (S20). Therefore, the vehicle speed can be easily controlled to a required vehicle speed regardless of the type of the deceleration target, and the mode can be changed at a timing corresponding to the type of the deceleration target.

Further, according to the embodiment, when it is determined that the deceleration target is a stop target, that is, a target that needs to stop the vehicle (S22), when it is determined that a predetermined time te has elapsed from the time when the deceleration target is first detected, it is determined that the deceleration target is the timing of the mode change (S70). Therefore, the mode from the accelerator operation amount mode to the non-accelerator operation amount mode can be changed when a predetermined time has elapsed from the time when the deceleration target is detected.

Further, according to the embodiment, the predetermined temporal tc is variably set according to the type of the speed target and the traveling condition of the vehicle (S22, S24, S30). Therefore, the timing of the mode change from the accelerator operation amount mode to the non-accelerator operation amount mode can be variably set in accordance with the type of the deceleration target and the traveling state of the vehicle.

Further, according to the embodiment, when it is determined that the steering operation is being performed (S30), the timing of the mode change is S36 compared to when it is not determined that the steering operation is being performed. Therefore, when the steering operation is being performed, it is possible to increase the timing of the mode change and increase the timing at which the vehicle is decelerated based on the target deceleration. Therefore, the driver can concentrate on the steering operation without controlling the accelerator operation amount at an early stage as compared with the case where the timing of the mode change is not accelerated.

Further, according to the embodiment, when it is determined that there are a plurality of deceleration targets, the timing of the mode change is made earlier than when it is determined that there is one deceleration target. Therefore, when there are a plurality of multi-deceleration targets, the timing of the mode change can be made faster than when there is one deceleration target, and the timing at which the vehicle is decelerated based on the target deceleration can be made faster. Therefore, it is possible to prevent the driver from controlling the accelerator operation amount earlier than in the case where the timing of the mode change is not accelerated.

The present disclosure has been described in detail above with respect to specific embodiments. However, it is obvious to those skilled in the art that the present disclosure is not limited to the above-described embodiments, and various other embodiments are possible within the scope of the present disclosure.

For example, in the above-described embodiment, the predetermined temporal tc is variably set according to both the type of the deceleration target and the traveling condition of the vehicle (S22, S24, S30). However, the predetermined time may be variably set in accordance with one of the type of the deceleration target and the traveling state of the vehicle. Further, the traveling situation of the vehicle in the embodiment is a situation in which the vehicle travels on an uphill road, but may include other traveling situations such as an inter-vehicle distance with the preceding vehicle and a weather situation.

For example, the order of execution of S22 and S30 in the first embodiment described above may be reversed, and the order of execution of S22 and S30 and S32 in the second embodiment may be reversed.

In addition, the value of the ratio Rec in the above-described embodiment is an example, and is not limited to the above-described value. Further, the ratio Rec is 1 when the deceleration target is the preceding vehicle, but may be smaller than 1 and greater than 0.8.

What is claimed is:

1. A vehicle deceleration assist control device comprising a driving assist electronic control unit (ECU) for executing a deceleration assist control of a vehicle, wherein the driving assist ECU is configured to:

determine whether a deceleration target is in front of the vehicle;

calculate, in a case where a determination is made that the deceleration target is in front of the vehicle, a target deceleration value for causing a vehicle speed of the vehicle at a time at which the vehicle reaches a position of the deceleration target to be a target vehicle speed, based on a current vehicle speed of the vehicle, a distance from the vehicle to the deceleration target, and the target vehicle speed determined according to a type of the deceleration target;

determine whether an accelerator of the vehicle is in an ON state in which an accelerator operation amount exceeds a reference value, or in an OFF state in which the accelerator operation amount is equal to or less than the reference value;

decelerate the vehicle based on the calculated target deceleration value in a case where a determination is made that the accelerator is in the OFF state;

in a case where a determination is made that the accelerator is in the ON state, (i) decelerate the vehicle according to the accelerator operation amount, (ii) set a mode change timing according to the type of the deceleration target, and (iii) decelerate the vehicle based on the calculated target deceleration value in a case where the mode change timing is reached; and in a case where the deceleration target is a preceding vehicle, set the mode change timing earlier in a case where the vehicle is traveling on an uphill road than in a case where the vehicle is traveling on a horizontal road.

* * * * *